US008190382B2

(12) United States Patent
Tillotson

(10) Patent No.: US 8,190,382 B2
(45) Date of Patent: May 29, 2012

(54) TOOL TO ANALYZE PERFORMANCE OF POWER-BEAM PHOTOVOLTAIC RECEIVER

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 764 days.

(21) Appl. No.: 12/327,098

(22) Filed: Dec. 3, 2008

(65) Prior Publication Data

US 2010/0138173 A1      Jun. 3, 2010

(51) Int. Cl.
*G01R 21/00*      (2006.01)
(52) U.S. Cl. ........................................ 702/60
(58) Field of Classification Search ............ 702/60; 136/246; 356/215; 126/574; 324/761.01
See application file for complete search history.

(56) References Cited

U.S. PATENT DOCUMENTS

| | | | | |
|---|---|---|---|---|
| 2,765,703 | A | * | 10/1956 | Ward et al. ................ 356/215 |
| 5,648,731 | A | * | 7/1997 | Decker et al. ............ 324/761.01 |
| 6,965,851 | B2 | | 11/2005 | Tillotson |
| 7,256,566 | B2 | | 8/2007 | Bhavaraju et al. |
| 2006/0118162 | A1 | * | 6/2006 | Saelzer et al. ................ 136/246 |
| 2008/0017239 | A1 | * | 1/2008 | Tillotson .................... 136/246 |
| 2011/0036343 | A1 | * | 2/2011 | Kroyzer et al. ............... 126/574 |

OTHER PUBLICATIONS

Hiren Patel and Vivek Agarwal, MATLAB-Based Modeling to Study the Effects of Partial Shading on PV Array Characteristics, IEEE Transactions on Energy Conversion, vol. 23, No. 1, Mar. 2008.
Sergey V. Vasylyev, Performance Measurements of a Slat-Array Photovoltaic Concentrator, SVV Technology Innovations, Inc., Presented at Solar 2004 Conference, Jul. 2004, Portland, OR.

* cited by examiner

*Primary Examiner* — Jonathan C Teixeira Moffat
*Assistant Examiner* — Xiuquin Sun
(74) *Attorney, Agent, or Firm* — McNees Wallace & Nurick LLC

(57) ABSTRACT

A tool to analyze the performance of a power-beam photovoltaic (PV) receiver is disclosed that includes a system and method for determining the output of a PV array under non-uniform, inconstant illumination. The system and method includes providing PV cells in a user-defined physical layout with various user-defined electrical connections among the PV cells and optional devices forming the PV array. The disclosure provides an analysis tool for designing optical power-beaming systems.

21 Claims, 4 Drawing Sheets

TOOL TO ANALYZE PERFORMANCE OF POWER-BEAM PHOTOVOLTAIC RECEIVER

FIELD OF THE INVENTION

This invention relates generally to methods and apparatuses for determining the electrical output of a photovoltaic array. The invention further relates generally to methods and apparatuses for determining the electrical output of photovoltaic arrays for beamed power systems under non-uniform, inconstant illumination, wherein the photovoltaic array includes photovoltaic cells in a user-defined physical layout with various user-defined electrical connections among the cells and other electrical devices.

BACKGROUND OF THE INVENTION

Currently, aircraft are limited in flight range and flight duration because of fuel capacity and fuel consumption. These limits require aircraft to return for refueling and also prevent them from unlimited flight ranges. Further, aircraft are also limited by weight constraints, such as the weight of the fuel necessary for travel that limits the speed and cargo capacity of the aircraft. Some airplanes use solar power to address these concerns, however, solar power systems experience power reductions due to weather and atmospheric changes, the Earth's annual and diurnal cycles, or solar eclipse. Therefore, aircraft that use solar power require supplemental or alternative sources of energy. Laser or microwave power beaming from the Earth's surface, from other aircraft, or from satellites orbiting the Earth can be used to supplement the solar power to aircraft.

Current systems that provide laser-beamed power to aircraft by using photovoltaic (PV) arrays and receivers have problems with obtaining uniformity of power transfer across the PV array. A PV array designed for solar powered applications includes PV cells arranged on a flat planar surface. In solar powered spacecraft or terrestrial solar power applications, the planar PV array experience generally uniform, steady irradiance across all the cells in the array. However, planar PC arrays do not experience a uniform irradiance across all the cells in the array when illuminated with laser-beamed power. The intensity of the laser varies across the width of the beam, with higher intensity at the center of the beam and generally weaker intensity away from the center. The irradiance received by a planar laser-power PV receiver is therefore non-uniform, with the strongest rays at the center of the PV array and weaker rays impinging upon the PV cells toward the edges of the PV array.

There are standard software tools for analyzing performance of known sunlit solar PV arrays, specifically, tools are available to analyze groups of series-connected strings of cells that receive uniform, constant illumination, except for a few areas of complete shadow when the array is partially shaded. These software tools are not sufficient for analyzing performance of PV arrays with complex interconnections receiving complex, time-varying illumination from a power beam. Thus, PV arrays designed from these static tools will be either over-designed, which incurs additional cost and weight, or under-designed, which may lead to failure under some operating conditions.

There is currently no tool that can analyze the performance of a PV array for producing power from a beam of light when the intensity profile of the beam is not uniform across the array, the position of the beam center on the array varies unpredictably with time, and the rotation of the beam cross section relative to the PV array varies unpredictably with time.

Therefore, a system and method is needed for designing PV cells subject to non-uniform irradiance in a laser-powdered PV array.

The foregoing examples and limitations associated therewith are intended to be illustrative and not exclusive. Other limitations of the related art will become apparent to those of skill in the art upon reading of the specifications and study of the drawings.

SUMMARY OF THE INVENTION

The following embodiments and aspects thereof are described and illustrated in conjunction with systems and methods that are meant to be exemplary and illustrative, not limiting in scope. In various embodiments, one or more of the problems described above in the Background have been reduced or eliminated, while other embodiments are directed to other improvements.

According to one exemplary embodiment of the invention, an analysis tool for a photovoltaic (PV) receiver is disclosed that includes a microprocessor, a memory device, a first data structure stored in the memory device comprising a PV cell characteristic of each PV cell of a PV array, a second data structure stored in the memory device comprising the intensity of illumination striking a predetermined number of points of the PV array, a means for computing the total illumination on each cell in a PV array based on data from the first data structure and the second data structure, a third data structure stored in the memory device comprising an electrical connectivity among each PV cell, and a means for computing the total power output of the PV array from the total illumination of each PV cell in the PV array.

According to another exemplary embodiment of the invention, a method of analyzing a PV receiver is disclosed that includes the steps of (a) providing a first data structure comprising a PV cell characteristic of each PV cell of a PV array, (b) providing a second data structure comprising an intensity of illumination striking a predetermined number of points of the PV array, (c) computing a total illumination on each PV cell from step (a) and step (b), (d) providing a third data structure comprising an electrical connectivity among each PV cell, (e) computing the total power output of the PV array from the total illumination of each PV cell, and (f) modifying a characteristic of at least one PV cell of the PV receiver in response to the computed total power output.

According to yet another exemplary embodiment of the invention, a computer program product embodied on a computer readable medium and executable by a microprocessor for determining the total power output of a PV array of a PV receiver is disclosed. The computer program product includes computer instructions for executing the steps of: (a) receiving a first data structure comprising a PV cell characteristic of each PV cell of a PV array, (b) receiving a second data structure comprising an intensity of illumination striking a predetermined number of points of the PV array, (c) computing a total illumination on each PV cell from step (a) and step (b), (d) receiving a third data structure comprising an electrical connectivity among each PV cell, and (e) receiving the total power output of the PV array from the total illumination of each PV cell.

One advantage of the present invention is to provide a tool to design a PV array that is optimally designed for a variable operation condition.

Another advantage of the present invention includes reducing cost and cycle time to analyze performance of a PV power receiver.

Another advantage of the present invention includes improved cost and performance of PV power receivers.

Further aspects of the method and apparatus are disclosed herein. Other features and advantages of the present invention will be apparent from the following more detailed description of the preferred embodiment, taken in conjunction with the accompanying drawings that illustrate, by way of example, the principles of the invention. The features, functions, and advantages of the present invention can be achieved independently in various embodiments of the present inventions or may be combined in yet other embodiments.

DETAILED DESCRIPTION OF THE INVENTION

Figure 1:
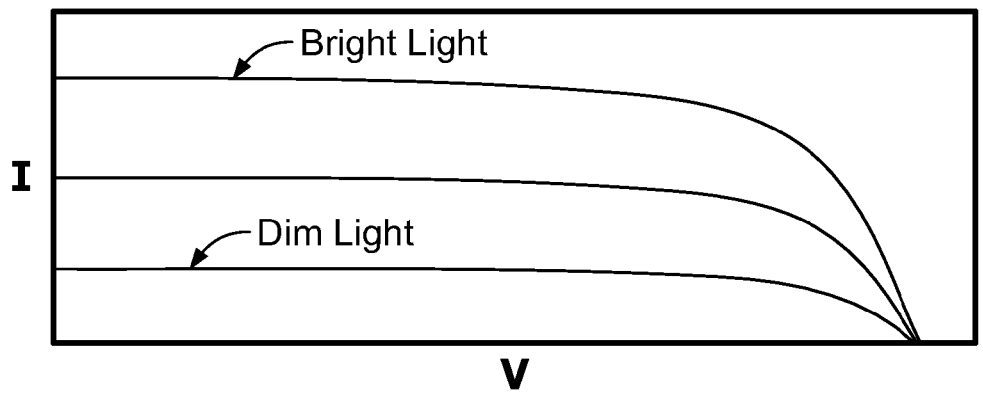
FIG. 1 is an exemplary graphical representation of current-voltage curves for a PV cell at three intensity levels.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. All composition percents are given as weight percents, unless otherwise specified.

Planar PV arrays or receivers that are designed for use with solar power have rows of identical photovoltaic cells arranged on a flat surface. With uniform illumination, all the PV cells in the PV array receive the same irradiance of light and produce approximately the same output power. The PV cells are connected in series in a string, and the strings are then connected in parallel with other strings to form the PV array. The PV cells are connected in series to produce a sufficient voltage. Within a string, all of the PV cells conduct the same amount of current. Multiple strings are connected in parallel to produce adequate current at the selected voltage. When the PV array is illuminated with uniform solar rays, each individual string of PV cells produces the same current. Further, since every PV cell in the array has roughly the same internal resistance, the resistive loss in each cell is approximately the same.

However, unlike sunlight, a long-range laser beam illuminating a planar PV array has a roughly Gaussian time-line averaged intensity profile. The Gaussian average intensity profile results in varied irradiance across the PV cells. The PV cells at the center of the PV array have much higher irradiance than the PV cells at the edge of he array. If a PV array is designed for optimum efficiency at the lower irradiance levels at the edges, the PV array will likely experience overheating at the center of the array, because the PV cells in the center are not rated for he higher irradiance beams incident of the center. The overheating of the PV cells at the center increases their electrical resistance and therefore increases resistive losses for the array. Conversely, a PV array designed for optimum efficiency at the high irradiance in the center or the PV array results in reduced average power production per PV cell, i.e. the PV cells at the edge do not receive the total irradiance for which they are rated, resulting in reduced power output. In either case, costly resources, i.e. PV cells, are used below their optimum capacity.

The problem arises in designing PV arrays for beams of light from artificial sources, as discussed above, are not like sunlight, due to non-uniform illumination as discussed above. Standard practice for designing PV arrays is to assume that the arrays will be used with uniform illumination. Hence, it is assumed that each cell produces the same power as its neighbors, and cells are wired in series strings where each cell passes the same current and imparts the same voltage rise as its neighbors.

However, with an artificial beam, this is not the case. One cell, A, may receive substantially less light than another cell, B. In this case, cell A would produce substantially less current than cell B. FIG. 1 shows the relationship of PV current to illumination. If cell A and cell B are wired in series, cell A blocks much of the current that cell B would produce. Therefore, even though cell B receives substantially more light than cell A, cell B's power output is reduced to barely more than cell A's power output. This reduces the overall efficiency of converting light to electricity. In an extreme case, one un-illuminated cell in a string can prevent all other cells in the string from producing power resulting in zero efficiency.

PV receiver concepts that mitigate these problems may take two approaches. In a first approach, capacitors are wired in parallel with PV cells to smooth out local fluctuations in current due to brief episodes of uneven illumination. An example of this first approach having a PV array and method of converting laser beam power to electrical energy has been disclosed in U.S. patent application Ser. No. 11/459,219, filed Jul. 21, 2006, which is incorporated herein by reference in it's entirety. This PV array includes a plurality of PV cells having each PV cell configured to receive at least one optical power beam and convert power from the at least one optical power beam to electrical power.

Figure 2:
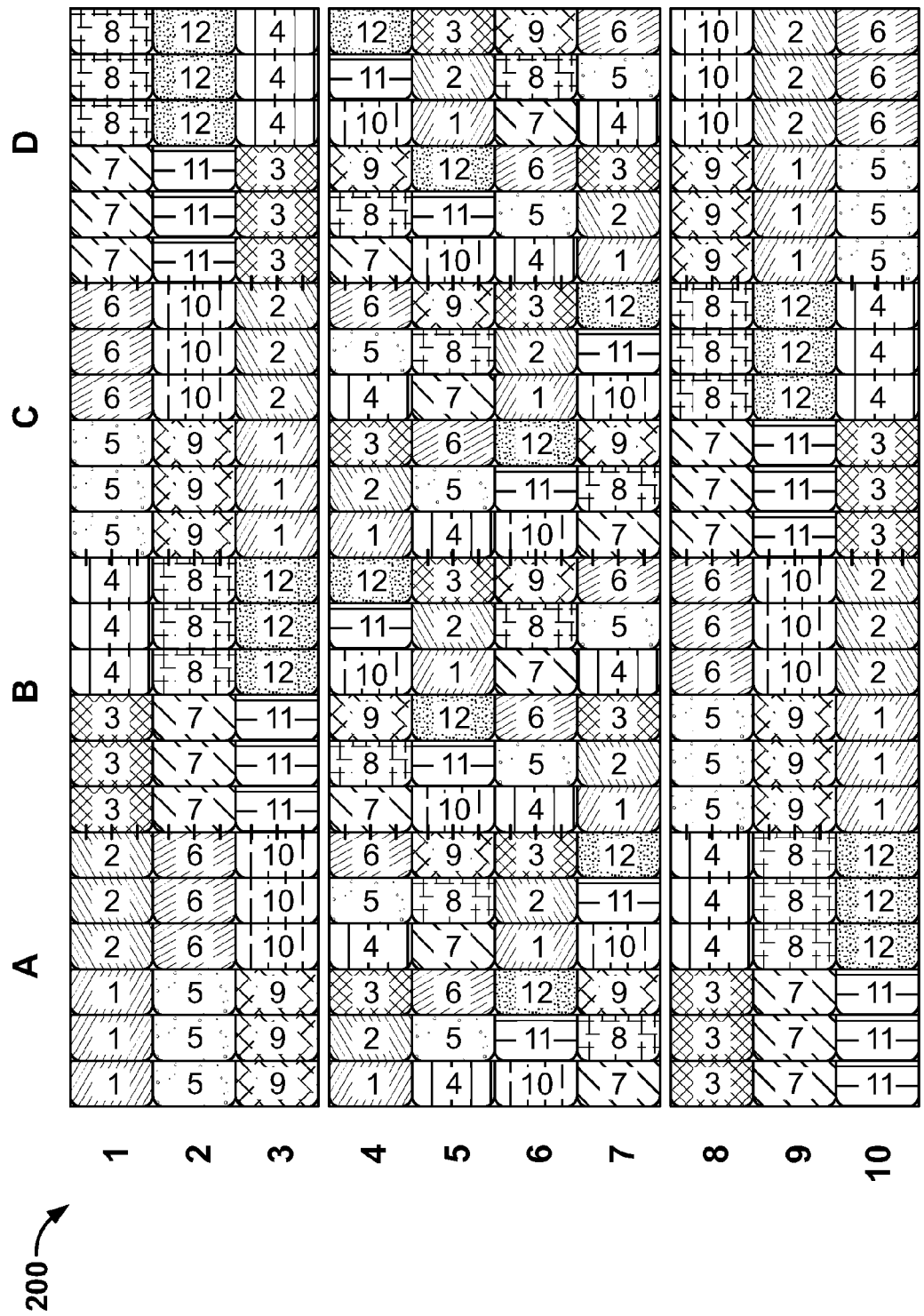
FIG. 2 shows an example of a PV array.

In a second approach, PV cells are interconnected in complex series-parallel arrangements to provide alternate paths for current when cells are unevenly illuminated. FIG. 2 shows an example of a PV design according to this second approach. In FIG. 2, the numbers within the individual cells indicate voltage at a positive terminal of each cell. In this example, cells in rows 1-3 and rows 8-10 each produce about 0.67 volt. The cells in rows 1-3 and 8-10 are ganged in groups of three to produce 2.0 volts. Cells in rows 4-7 each produce about 2.0 volts individually. Numbers in the cells indicate voltage in multiples of 2.0 volts. For example, the positive terminal of each cell labeled "7" in rows 1-3 and 8-10 is connected to a node nominally at 14 volts and the negative terminal is connected to a node at 12 volts.

FIG. 2 shows a PV array 200 constructed by manually overlaying a PV grid pattern on a printed intensity plot and looking for limitations in voltage output performance. For example, if all cells at voltage level 3 receive low illumination when the PV array is rotated and offset in a plausible manner, then the output of the PV array 200 is limited by the level 3 cells. Other factors that may affect voltage output of the PV array 200 were not considered because of the complexity of varying the PV array output for multiple variables.

Figure 3:
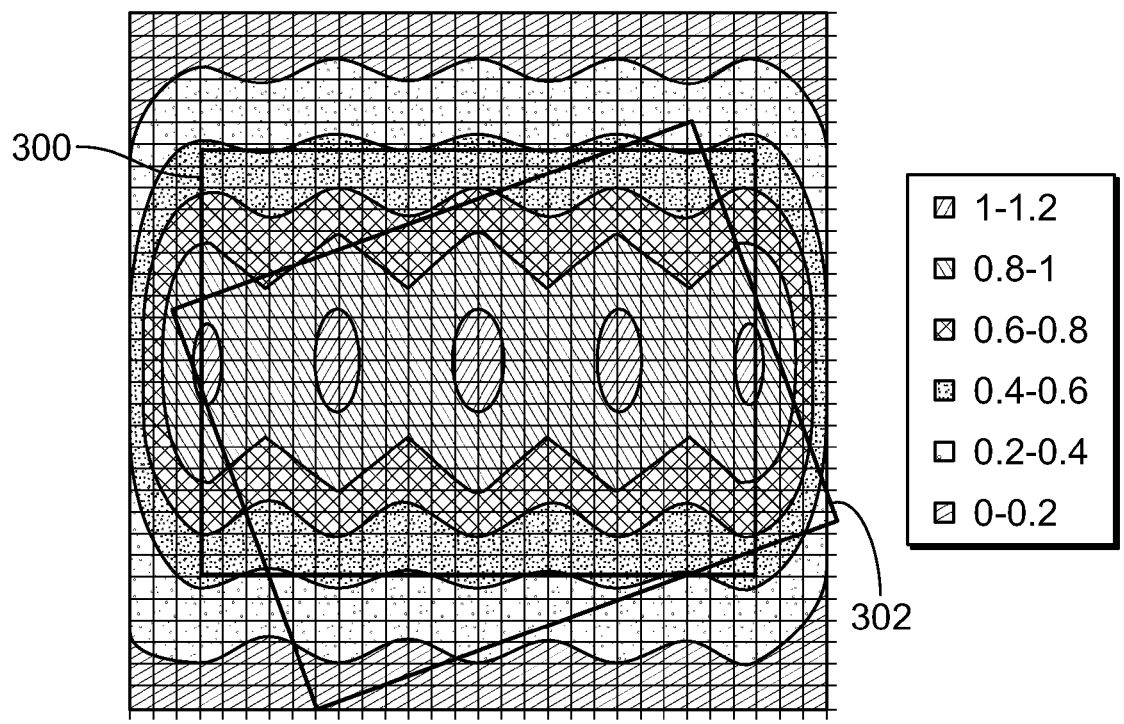
FIG. 3 shows an exemplary intensity pattern for a power beam.

The difficulty of analyzing the performance of such an array in a power beaming application becomes apparent from FIG. 3, which shows an exemplary beam intensity pattern produced from a beam source comprising five laser diodes and optics that expand and align the beams. The table provides the relative intensity key. As shown in FIG. 3, a first position boundary 300 shows the position of a PV array in a nominal position. The first position boundary 300 is centered in the beam and aligned with the beam's lateral axes. In one embodiment, the first position boundary 300 measures approximately 80 cm×60 cm. A second position boundary 302 shows the position of a PV array this is likely to occur in operation. The second position boundary is offset from the center of the beam and is rotated relative to the beam's axes. Manually computing the voltage and current output from the PV array in either of these case is extremely time consuming and prone to error. Additionally, the output of the PV array as the beam's center moves to different positions over the PV array, and the amount of rotation changes. Furthermore, the array may include additional capacitors and/or other energy storage elements that may change the PV array output. Additionally, the recent illumination history of the PV array may affect output. The dimensions of the exemplary embodiment are not intended to limit the application of the disclosed concept, which may be applied to PV arrays of various dimensions.

Figure 4:
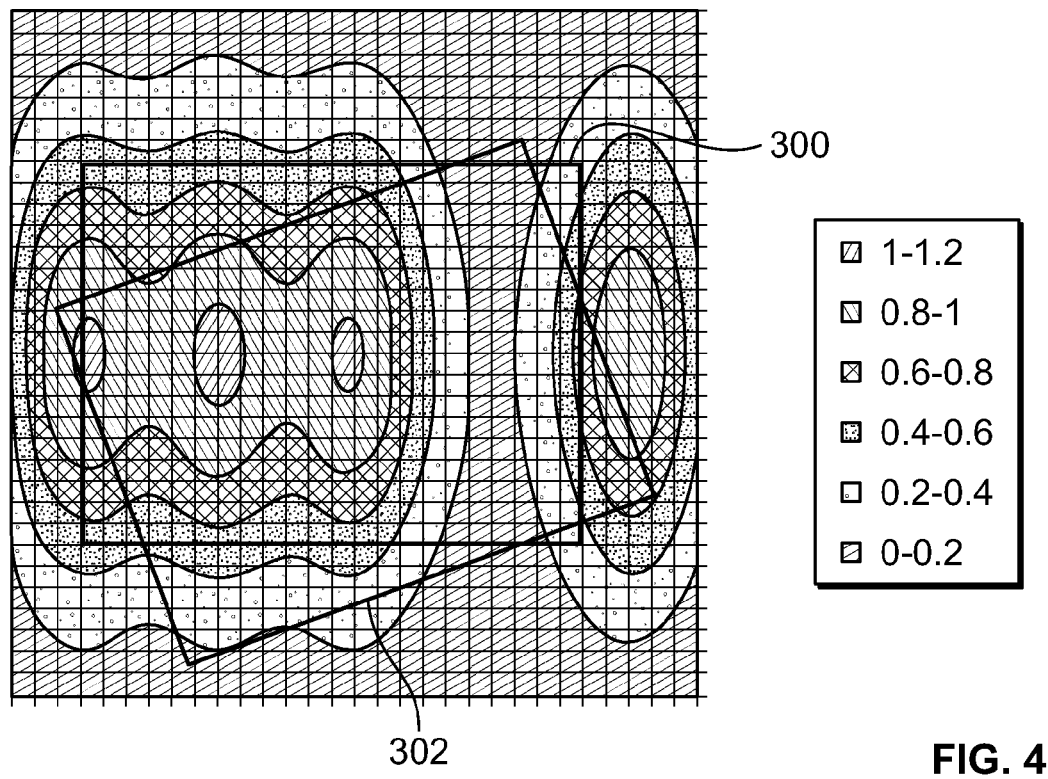
FIG. 4 shows an exemplary alternative intensity pattern for a power beam.

Another factor that may affect the PV array output is variations in the intensity pattern of the beam, for example, but not limited to when any one laser of the lasers forming the beam fails. An example of a pattern resulting from a failure of one laser in a beam formed of five lasers is shown in FIG. 4. The table provides the relative intensity key.

Figure 5:
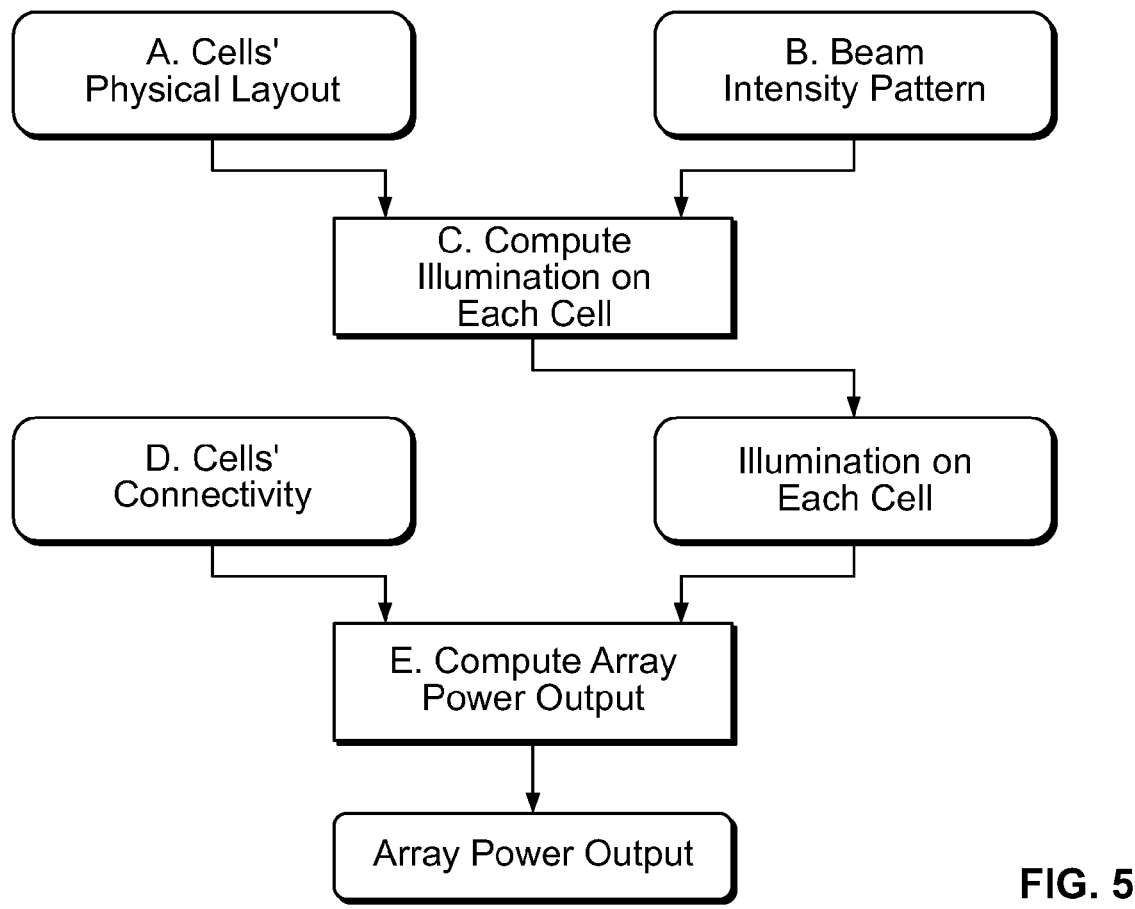
FIG. 5 shows an exemplary embodiment of an analysis tool and system according to the disclosure.
Figure 6:
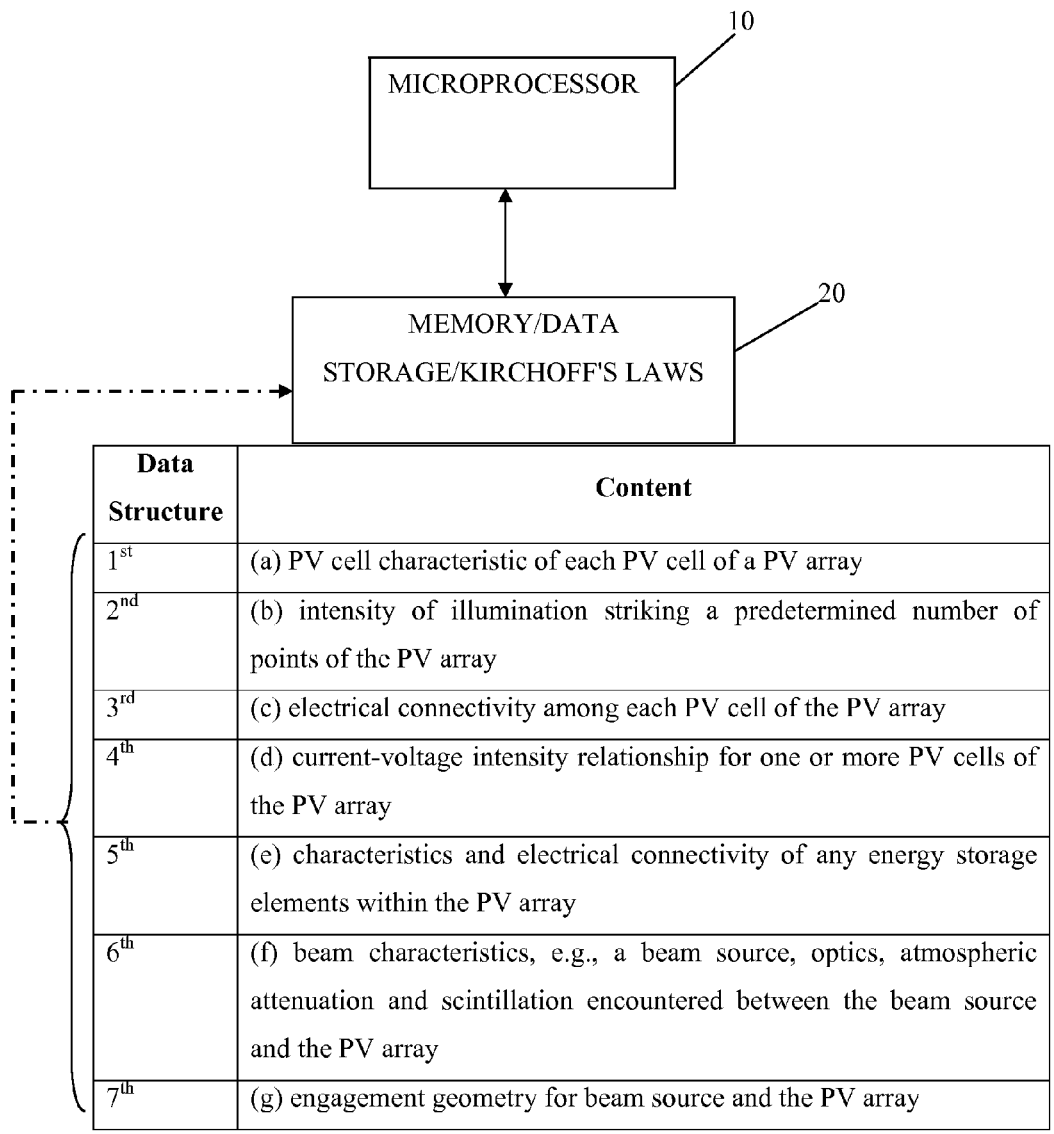
FIG. 6 shows an exemplary schematic diagram of an analysis tool and system according to the disclosure.

In one embodiment of the invention shown in Figs. 5 and 6, an analysis tool and system is disclosed that allows for rapid assessment of various PV array configurations under a variety of illumination conditions. As shown in FIG. 5, data input is shown as rounded boxes and software components are shown as rectangles. At least some of the operations depicted in FIG. 5 can be embodied in or performed by software or other machine-readable instructions stored on a machine-readable medium on a memory device 20 of a microprocessor 10. It is understood that the various operations depicted in FIG. 5, and optional operations that may be added, need not necessarily occur in the exact order shown, and that certain operations can be added, deleted, combined or modified. The analysis tool and system includes inputting to a computer software program:

(a) a first data structure, such as a first data file, specifying the PV cell characteristics of each PV cell in an array;
(b) a second data structure, such as a second data file, specifying the intensity of illumination striking each point of the array; and
(c) a third data structure, such as a third data file, specifying the electrical connectivity among the PV cells.

The PV cell characteristics in (a) above may include, but are not limited to, the physical size, shape, position and orientation of each PV cell in an array.

The intensity of illumination striking each point of the PV array in (b) above may otherwise be referred to as the beam intensity pattern. The electrical connectivity among the PV cells in (c) above may include, for example, both parallel and series connections.

The analysis tool and system further includes software to compute the total illumination on each cell in the PV array from the (a) and (b) inputs, and software to compute the total output of the PV array from the total illumination of each cell in the PV array and (c) input.

The analysis tool and system may optionally include inputting to a computer software program:

(d) a fourth data structure, such as a fourth data file, specifying the current-voltage intensity relationship for one or more PV cells of the PV array;
(e) a fifth data structure, such as a fifth data file, specifying the characteristics and electrical connectivity of any energy storage elements within the PV array;
(f) a sixth data structure, such as a sixth data file, specifying beam characteristics including, but not limited to a beam source, optics, and atmospheric attenuation and scintillation encountered between the beam source and the PV array; and
(g) a seventh data structure, such as a seventh data file, specifying one or more engagement geometries for a beam source and the PV array.

The energy storage elements within the PV array include, but are not limited to capacitors and batteries.

The analysis tool and system may further optionally include software to vary the electrical connectivity among the PV cells to optimize power output over a specified distribution of intensity patterns. In another embodiment, other measurable outputs, such as, but not limited to voltage, current and/or power spectrum may be optimized in place of or in addition to power output.

The analysis tool and system may yet further optionally include software that processes at least one input from (d), (e), (f) and (g) to compute a corresponding intensity pattern(s) (h) and which further inputs (h) into the software to compute the total illumination on each cell in the PV array from the (a) and (b) inputs.

In another embodiment, step (a) of inputting the physical size, shape, position and orientation of each PV cell in an array includes data for a substantially flat PV array that includes specifying the (x,y) positions of two opposite corners and associating a unique identifier for the PV cells forming the PV array. If the shape of the PV cells varies, the shape, including the geometry, of each corresponding cell is specified.

In another embodiment, step (a) of inputting the physical size, shape, position and orientation of each PV cell in an array includes data for a non-flat PV array that includes specifying the (x,y,z) position for each cell center and two angular coordinates to specify the cells orientation in three-dimensional space. If the shape of the PV cells varies, the shape of each corresponding cell is specified.

In yet another embodiment, step (a) may further include inputting by a graphical editing interface that allows an operator to manipulate PV cells as graphical objects that can be created, moved, rotated, deleted, resized and reshaped In another embodiment, step (b) of inputting the intensity of illumination striking each point of the array includes specifying an intensity value for at least one (x,y) position.

In another embodiment, step (b) includes inputting values for more than one wavelength of light. In this embodiment, the ratio of intensity in the various wavelengths may vary from various PV array positions and/or may additionally vary as a function of time and includes an intensity value for each wavelength band. Furthermore, in this embodiment, the analysis tool and system may include software to compute the output of each cell using wavelength-specific efficiency factors.

In another embodiment, the PV array includes energy storage elements and the intensity pattern varies with time. In this embodiment, multiple sets of records corresponding to intensity patterns at specified times are input, with each input including a time at which the specified intensity pattern occurs. Furthermore, in this embodiment, the analysis tool and system may include software to compute the time-varying illumination on each cell. This allows the analysis tool and system to compute the response of dynamic elements of energy storage devices including, but not limited to, capacitors.

In another embodiment, an intensity pattern for a single time is specified, but the intensity pattern includes a temporal pattern of intensity at a given (x,y) position. The temporal pattern may be specified by, for example, a Fourier transform of intensity vs. time. The Fourier transform provides the temporal pattern as a set of amplitudes for real and imaginary frequency components. This embodiment permits the analysis tool and system software to compute the PV array output response in the frequency domain rather than in the time domain.

In another embodiment, the analysis tool and system software compute the total illumination on each cell in the PV array from the (a) and (b) inputs includes computing each cell's centroid (x,y) position, interpolating the intensity at each cell's centroid (x,y) position using a curve-fit of intensity values, and multiplying the intensity at each cell's centroid (x,y) position by the area of the cell to compute total illumination on each cell.

In another embodiment, the analysis tool and system software to compute the total illumination on each cell in the PV array from the (a) and (b) inputs includes applying a grid pattern to cover each cell, interpolating the intensity at an area of interest of each grid element of the grid pattern, multiplying the intensity at each grid element by the area of each grid element to compute total illumination on each cell. The area of interest may be, for example, the grid center. This embodiment may also include interpolating the intensity of each wavelength band at each area of interest of each grid element. This embodiment may also further include interpolating the amplitude of each Fourier frequency component at each area of interest of each grid element.

In another embodiment, step (c) inputs the electrical connectivity, either series or parallel, among the PV cells and includes assigning a unique identifier for each cell that corresponds to the identifier assigned in step (a), specifying the identity of an electrical node attached to the positive terminal of each cell, and specifying the identity of an electrical node attached to the negative terminal of each cell. In this embodiment, cells that share the same negative-terminal node and the same positive-terminal node are connected in parallel, and cells where the positive-terminal node of one cell is the negative-terminal node of another cell are connected in series. In this embodiment, a graphical editing interface may be used to allow an operator to vary connections among the cell terminals as graphical lines or arcs that can be created, deleted, connected and/or disconnected.

In another embodiment, the analysis tool and system software computes the total output of the PV array from the total illumination of each cell in the PV array and (c) input includes a numerical solver that applies Kirchoffs laws, the intensity at each cell, the current-intensity characteristics of each cell, and the electrical connectivity among the cells to compute the total voltage and current output of the PV array. In this embodiment, the software can compute the PV array output each time an operator adds, deletes, and/or moves a cell, and/or changes the connectivity among the cells, and display the resulting current, voltage and power of the PV array.

In another embodiment, an optional step (d) inputs the current-voltage intensity relationship for one or more PV cells of the PV array, further includes specifying a unique identifier for each PV cell and/or a current-voltage-intensity relationship. The current-voltage-intensity relationship may be specified as a set of numerical parameters for a set of equations and/or as a list of 3-element data linking particular values of current, voltage, and intensity, from which a software component can interpolate other values of current, voltage, and intensity. In yet other embodiments, optional step (d) may input a special identifier symbol that includes all cells, instead of specifying an individual current-voltage-intensity relationship for each cell. In other words, a single current-voltage-intensity relationship is applied to all cells in the PV array.

In another embodiment, an optional step (e) inputs the characteristics and electrical connectivity of any energy storage elements, such as, but not limited to capacitors and batteries, within the PV array, further includes each record including fields to specify device type (e.g. capacitor or battery) and characteristics of the device (e.g. capacitance for a capacitor), and/or a connectivity for each terminal of the device to a node.

In another embodiment, the analysis tool and system software automatically adjusts the electrical connectivity among the PV cells to optimize power output and/or other related parameter over a specified statistical distribution of intensity patterns includes using a discrete search algorithm that varies discrete parameters like connectivity rather than real-valued parameters like temperature to find an optimum or hear optimum power outpour and/or other related parameter. The discrete search algorithm may be, for example, a genetic program that optimizes a cost function such as power output by evolutionary selection of connectivity patterns for the purpose of assessing power output of each candidate connectivity solution against a set of intensity patterns chose by an operator. In one embodiment, the algorithm is drawn from a statistical distribution of operational power beaming system parameters. For example, the distribution may include one or more worst case intensity patterns.

In another embodiment, an optional step (f) inputs beam characteristics including, but not limited to a beam source, optics, and atmospheric attenuation and scintillation encountered between the beam source and the PV array, further includes an optics analysis program.

In another embodiment, an optional step (g) inputs one or more engagement geometries for a beam source and the PV array further includes satellite operational software.

In another embodiment, the analysis tool and system software estimates the atmospheric attenuation and scintillation encountered between the beam source and a PV receiver further includes a curve-fit spreadsheet based on tables of atmospheric properties and/or an atmospheric propagation model.

In another embodiment, the analysis tool and system software may optionally include a software component that includes "glue code" that links the output of each software element to the input of the next software element, translating file formats as needed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It is therefore further intended that the following appended claims and claims hereafter introduced are interpreted to include all such modifications, permutations, additions, and sub-combinations as are within their true spirit and scope

The invention claimed is:

1. An analysis tool for a photovoltaic (PV) receiver, comprising:
   a microprocessor;
   a memory device;
   a first data structure stored in the memory device comprising a PV cell characteristic of each PV cell of a PV array;
   a second data structure stored in the memory device comprising the intensity of illumination striking a predetermined number of points of the PV array;
   computer instructions for computing the total illumination on each cell in a PV array based on data from the first data structure and the second data structure;
   a third data structure stored in the memory device comprising an electrical connectivity among each PV cell;
   a numerical solver that applies Kirchoffs laws to the total illumination on each cell and the third data structure to compute a total output power of the PV array from a total voltage and current output of the PV array; and
   computer instructions for computing a power output of the PV array by varying the electrical connectivity among each PV cell over a specified distribution of beam intensity patterns.

2. The analysis tool of claim 1, wherein the PV cell characteristic comprises a physical size, shape, position and orientation of each PV cell of the PV array.

3. The analysis tool of claim 1, further comprising:
   a fourth data structure stored in the memory device comprising a current-voltage-intensity relationship for at least one PV cell of the PV array;
   wherein the numerical solver further applies the fourth data structure to compute a total output power of the PV array from a total voltage and current output of the PV array.

4. The analysis tool of claim 1, further comprising:
   a fifth data structure stored in the memory device comprising a characteristic and an electrical connectivity for any energy storage elements within the PV array;
   wherein the numerical solver further applies the fifth data structure to compute a total output power of the PV array from a total voltage and current output of the PV array.

5. The analysis tool of claim 1, further comprising:
   a sixth data structure stored in the memory device comprising at least one beam characteristic selected from a group comprising a beam source, beam optics, and at least one atmospheric attenuation and scintillation parameter encountered between a beam source and the PV array;
   wherein the numerical solver further applies the sixth data structure to compute a total output power of the PV array from a total voltage and current output of the PV array.

6. The analysis tool of claim 1, further comprising:
   a seventh data structure stored in the memory device comprising at least one engagement geometry for a beam source and the PV array;
   wherein the numerical solver further applies the seventh data structure to compute a total output power of the PV array from a total voltage and current output of the PV array.

7. The analysis tool of claim 1, further comprising:
   computer instructions for computing a total illumination on each PV cell in the PV array.

8. A method of analyzing a photovoltaic (PV) receiver, comprising to following steps:

(a) providing a first data structure comprising a PV cell characteristic of each PV cell of a PV array;
   (b) providing a second data structure comprising an intensity of illumination striking a predetermined number of points of the PV array;
   (c) computing a total illumination on each PV cell from step (a) and step (b);
   (d) providing a third data structure comprising an electrical connectivity among each PV cell; and
   (e) computing the total power output of the PV array from the total illumination of each PV cell by applying Kirchoffs laws to the total illumination on each PV cell and the third data structure; and
   (f) modifying a characteristic of at least one PV cell of the PV receiver in response to the computed total power output; and
   (g) computing a power output of the PV array by varying the electrical connectivity among each PV cell over a specified distribution of beam intensity patterns.

9. The method of claim 8, wherein the PV cell characteristic comprises a physical size, shape, position and orientation.

10. The method of claim 8, further comprising:
    providing a fourth data structure comprising a current-voltage-intensity relationship for at least one PV cell of the PV array;
    wherein the numerical solver further applies the fourth data structure to compute a total output power of the PV array from a total voltage and current output of the PV array.

11. The method of claim 8, further comprising:
    providing a fifth data structure comprising a characteristic and an electrical connectivity for any energy storage elements within the PV array;
    wherein the numerical solver further applies the fifth data structure to compute a total output power of the PV array from a total voltage and current output of the PV array.

12. The method of claim 8, further comprising:
    providing a sixth data structure comprising at least one beam characteristic selected from a group comprising a beam source, beam optics, and at least one atmospheric attenuation and scintillation parameter encountered between a beam source and the PV array;
    wherein the numerical solver further applies the sixth data structure to compute a total output power of the PV array from a total voltage and current output of the PV array.

13. The method of claim 8, further comprising:
    providing a seventh data structure comprising at least one engagement geometry for a beam source and the PV array;
    wherein the numerical solver further applies the seventh data structure to compute a total output power of the PV array from a total voltage and current output of the PV array.

14. The method of claim 8, further comprising:
    computing a total illumination on each PV cell in the PV array.

15. A computer program product embodied on a non-transitory computer readable medium and executable by a microprocessor for determining the total power output of a photovoltaic (PV) array of a PV receiver, the computer program product comprising computer instructions for executing the steps of:
    (a) receiving a first data structure comprising a PV cell characteristic of each PV cell of a PV array;
    (b) receiving a second data structure comprising an intensity of illumination striking a predetermined number of points of the PV array;

(c) computing a total illumination on each PV cell from step (a) and step (b);
(d) receiving a third data structure comprising an electrical connectivity among each PV cell;
(e) computing the total power output of the PV array from the total illumination of each PV cell by applying Kirchoffs laws to the total illumination on each PV cell and the third data structure; and
(f) computing a power output of the PV array by varying the electrical connectivity among each PV cell over a specified distribution of beam intensity patterns.

16. The computer program product of claim 15, wherein the PV cell characteristic comprises a physical size, shape, position and orientation.

17. The computer program product of claim 15, further comprising:
receiving a fourth data structure comprising a current-voltage-intensity relationship for at least one PV cell of the PV array;
wherein the numerical solver further applies the fourth data structure to compute a total output power of the PV array from a total voltage and current output of the PV array.

18. The computer program product of claim 15, further comprising:
receiving a fifth data structure comprising a characteristic and an electrical connectivity for any energy storage elements within the PV array;
wherein the numerical solver further applies the fifth data structure to compute a total output power of the PV array from a total voltage and current output of the PV array.

19. The computer program product of claim 15, further comprising:
receiving a sixth data structure comprising at least one beam characteristic selected from a group comprising a beam source, beam optics, and at least one atmospheric attenuation and scintillation parameter encountered between a beam source and the PV array;
wherein the numerical solver further applies the sixth data structure to compute a total output power of the PV array from a total voltage and current output of the PV array.

20. The computer program product of claim 15, further comprising:
receiving a seventh data structure comprising at least one engagement geometry for a beam source and the PV array;
wherein the numerical solver further applies the seventh data structure to compute a total output power of the PV array from a total voltage and current output of the PV array.

21. The computer program product of claim 15, further comprising:
computing a total illumination on each PV cell in the PV array.

* * * * *